United States Patent [19]

Niessen et al.

[11] Patent Number: 5,367,638
[45] Date of Patent: Nov. 22, 1994

[54] DIGITAL DATA PROCESSING CIRCUIT WITH CONTROL OF DATA FLOW BY CONTROL OF THE SUPPLY VOLTAGE

[75] Inventors: Cornelis Niessen; Cornelis H. van Berkel, both of Eindhoven, Netherlands

[73] Assignee: U.S. Philips Corporation, New York, N.Y.

[21] Appl. No.: 951,520

[22] Filed: Sep. 25, 1992

[30] Foreign Application Priority Data

Dec. 23, 1991 [EP] European Pat. Off. ........ 91203381.8

[51] Int. Cl.$^5$ .......................... G06F 1/32; G06F 13/00
[52] U.S. Cl. ...................... 395/250; 395/750; 364/707; 364/273.1; 364/273.2; 364/273.3; 364/239; 364/239.6; 364/239.7; 364/DIG. 1; 365/227
[58] Field of Search ............... 395/250, 275, 750, 200; 307/475, 269, 480; 375/109; 365/189.05, 227; 364/707

[56] References Cited

U.S. PATENT DOCUMENTS

| | | | |
|---|---|---|---|
| 4,490,796 | 12/1984 | Bigbie et al. | 364/519 |
| 4,525,849 | 6/1985 | Wolf | 375/118 |
| 4,571,702 | 2/1986 | DeArras | 364/900 |
| 4,674,034 | 6/1987 | Iwashita et al. | 364/200 |
| 4,777,609 | 10/1988 | Canill et al. | 364/519 |
| 4,829,421 | 5/1989 | Ritchie | 364/200 |
| 4,860,193 | 8/1989 | Bentley et al. | 364/200 |
| 5,005,136 | 4/1991 | van Berkel et al. | 364/490 |
| 5,121,000 | 6/1992 | Naghshineh | 307/443 |
| 5,142,684 | 8/1992 | Perry et al. | 395/750 |
| 5,167,024 | 11/1992 | Smith et al. | 395/375 |

OTHER PUBLICATIONS

R. A. Skov & E. G. Newman, Buffer System, IBM Tech. Discl. Bul., vol. 2, No. 5, Feb. 1960, pp. 86–89.
P. Macken et al, A Voltage Reduction Techniqe for Digital Systems, ISSCC 90, Feb. 16, 1990, pp. 238–239.
K. van Berkel et al, The VLSI-Programming Language Tangram and its Translation Into Handshake Circuits, EDAC, Amsterdam, The Netherlands, Feb. 1991.
Mead & Conway, Introduction to VLSI Systems; Addison-Wesley, 1980, pp. 250–252.

Primary Examiner—Gopal C. Ray
Attorney, Agent, or Firm—Bernard Franzblau

[57] ABSTRACT

Digital data processing electronic circuitry based on self-timed elements. The operating speed of the electronic circuitry is determined by its power supply voltage. Moreover, a buffer is connected either to the input or to the output of the electronic circuitry. A filling degree signal from the buffer is fed back to a control input of a power supply voltage controller for the electronic circuitry. In this way the supply voltage of the electronic circuitry is adjusted to control the data flow in such a way that the buffer tends not to fill up or to become empty.

22 Claims, 2 Drawing Sheets

DIGITAL DATA PROCESSING CIRCUIT WITH CONTROL OF DATA FLOW BY CONTROL OF THE SUPPLY VOLTAGE

FIELD OF THE INVENTION

This invention relates to an apparatus comprising a data source which feeds a buffer for intermediate storage of data and subsequent outputting thereof and comprising a feedback circuit which, under control of a filling degree signal of the buffer, dynamically controls the data handling rate of the data source. Such an apparatus is known from Skov and Newman, Buffer System, IBM Technical Disclosure Bulletin, Vol. 2, No. 5, February 1960, pages 86–89. The data source is a seven-channel magnetic tape, the buffer is a six word magnetic core store at seven bits per word, and the data destination is a synchronous unit. The feedback signal allows for the control of acceleration and deceleration, respectively, of the magnetic tape. In this way problems relating to tape speed variation are mitigated.

The present invention is based upon the fact that modern design methodologies for electronic circuitry have attained the stage wherein miniaturization of many functionalities within a single, stand-alone, battery-operated unit has become feasible. Moreover, self-timed digital electronics have been developed that need no clock synchronization. This means that within a chain of circuit elements the sequence of activations is correct on any time scale.

SUMMARY OF THE INVENTION

Accordingly, according to one of its aspects, it is an object of the present invention to realize an apparatus wherein dynamic power saving is combined with intrinsically correct functioning. Power saving means a longer life for non-rechargeable batteries, Alternatively, a smaller battery could be used without too much of a compromise as regards uninterrupted service. Moreover, at a lower current drawn, the same battery often shows a higher rating as measured in ampere-hours. In rechargeable batteries, lowering the current means less recharging, or again, a smaller battery and less weight. And in technologically advanced designs the lower current means lower dissipation leading to lower requirements on heat transport capability. And this could lead to cheaper packaging, such as a plastic DIL instead of a ceramic DIL module. In other circumstances, expensive provisions for cooling could be omitted. Even in the case of mains-powered apparatus, the power saving could be a favourable property.

According to one of its aspects, the objects are achieved in that the apparatus is characterized in that said data source means comprise integrated digital data processing electronic circuitry based on self-timed elements and in that said feedback circuit controls an actual powering (energizing) voltage of said circuitry, which powering voltage directly determines the operating speed of said electronic circuitry. The operating speed monotonously increases with the powering voltage, provided that the latter voltage is between prespecified boundaries and operates according to complex physical laws that need not be considered here. The handling rate in electronic synchronous circuitry has, up to now, been realized generally on an off/on-basis. By itself, the principles of self-timing are treated in Mead & Conway, Introduction to VLSI Systems, Addison-Wesley 1980, pages 242–262. A particular example is a PLA-type full adder on pages 250–252. Furthermore, a specific realization is by delay-insensitive elements, see U.S. Pat. No. 5,005,136, in particular FIGS. 14, 15 thereof. This design methodology has been evolved further in Kees van Berkel et at., The VLSI Programming Language Tangram and its Translation into Handshake Circuits, submitted to the European Design and Automation Conference, EDAC, Amsterdam, The Netherlands, February 1991. By itself, the influence of the powering voltage level on the functioning or otherwise of synchronous circuitry has been considered in P. Macken et at., A voltage reduction technique for digital Systems, ISSCC '90/Friday, Feb. 16, 1990, proceedings pages 238/239. Therein, only the feasibility of attaining a minimum powering voltage while still operating correctly was addressed. No attention was directed to the influence of the momentary situation on the effectiveness of operations related to the data processing itself. None of the references addresses the feasibility of operating at various voltage levels in self-timed electric circuit elements and applying the advantages offered thereby on a higher organizational level. According to the present invention, the processing may go faster or slower because of various operational conditions that would influence data throughput:

- although the processing speed is the same, the data destination may dynamically require a greater or lesser throughput as defined as the number of data items required;
- due to some particular circumstance, the processing takes more operations, for example, additional iterations, to produce the same number of data items. A particular example is where the data processing is related to error correction decoding. This may require different levels of processing: decoding a faultless word takes fewer operations as compared to a faulty one;
- various other operational conditions may be influential on the effective overall processing speed besides those that are determined by the behaviour of the data processing devices. First, ambient temperature would influence operating speed. At the same supply voltage level operation slows down with raised temperature. Therefore, at lower temperatures the operating voltage level may be lowered. In particular, according to the invention, the voltage level is not controlled by the ambient temperature itself, but by the effects of ambient temperature on the processing. Often, this would lead to about the lowest powering voltage that just barely meets processing requirements;
- another variable is due to variations in manufacturing process technology spread: a spread in operational speed of 20% is not uncommon. This means that "faster" units of a particular circuit may be driven at a lower powering voltage level without any pre-use testing in this respect. Of course, such test may nevertheless be executed to set ultra-low consumption devices apart from those that are standard grade.

All of these effects could influence the filling state of the buffer recited. Moreover, the effects of those conditions are additive, which means that large spreads could occur in practice between best case and worst case. Therefore, also the power saving according to the above may be quite appreciable.

Alternatively to having the data processing at the input of the buffer, it can be situated at the output thereof. Accordingly, another aspect of the invention relates to an apparatus comprising buffer means for receiving and intermediate storing of data and subsequent outputting thereof to data processing means, and comprising feedback means for, under control of a filling degree signal of said buffer means, dynamically controlling the data handling rate of said data processing means, said data processing means comprising electronic integrated circuitry based on self-timed elements and said feedback means controlling an actual powering voltage of said circuitry, which powering voltage directly determines the operating speed of said electronic circuitry. Generally, similar arguments apply as before, although the direction of the data transfer between the buffer and the data processing is now the other way round. It should be obvious that the buffer/data processing combination may form part of a more comprehensive entity that may, but need not follow the power level regulation as recited supra. Other pans of such an entity may be synchronized by a fixed clock, may be in another technology, or in another integrated circuit chip. Even if the circuitry of another element were identical, it may have another operational speed due to the spread in the manufacturing process.

A further example of variations in the apparently required processing power would be a recording apparatus that was capable of high-speed dubbing: the information is then copied at twice the standard read-out speed (or some other factor), which would tax the processing elements quite a bit more than normal use. Only in this case would the higher powering level(s) be used.

Still another advantageous example is in pattern recognition (visual, audio or other). Often, the input signal is first scanned for candidate locations, after which a candidate found is completely scrutinized. As long as no candidate is found, the amount of processing is small, and an input buffer containing the input signal samples would tend to become empty. Then, the voltage level of subsequent processing circuitry can be lowered.

Various other aspects of the invention are recited in the dependent claims, although not all of them need be present for nevertheless achieving the invention's advantages. For example, the invention may be advantageously used in remote-solar-cell powered devices.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
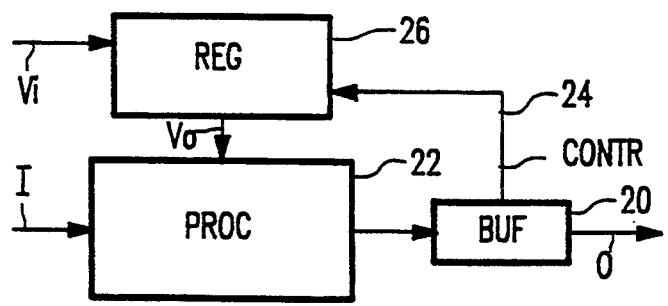
FIG. 1 shows an embodiment of the present invention with feedback control.

The invention, inter alia, aims at the extension of battery lifetimes in portable equipment such as lap-tops, CD-, DCC-players and mobile communication equipment incorporating asynchronous electronic circuits. This extension is realized by reducing the power consumption of the asynchronous circuits. The invention proposes control mechanisms for this purpose.

Many electronic products formerly using analog signal processing now utilize digital signal processing. For example, the gramophone record player is succeeded by the Compact Disc and the cassette recorder is being replaced by the Digital Compact Cassette system. Several applications in digital audio broadcasting and digital communication are soon to follow. All of these products, including computers, can have dimensions such that they can be used as portables. However, the mount of data processing performed in these products is of a level such that power dissipation is in point of fact too large for a battery supply, taking into account commercially acceptable life of the battery versus the total weight of the apparatus in question.

IC's are designed to operate properly under certain given worst case conditions. Such conditions may be the operating temperature, IC processing variations etcetera. They also are designed to have a specified performance at a certain maximum workload. These conditions have a significant impact on dissipated power. For typical operating conditions and typical workload the circuits are considerably faster than required and hence dissipate more power than necessary.

In synchronous systems it is hard to obtain such a reduced power consumption, cf. the Macken reference, supra. Although it is possible to reduce the supply voltage, an excess decrease in voltage will yield a malfunctioning circuit. A reduction of the clock frequency is even harder, if at all possible, to obtain. In an asynchronous circuit, the result of providing excess power is that the circuit behaves beyond the specified performance. Normally, the required performance will be achieved by means of synchronization with external circuits. The extent of the present invention is to insert a buffer circuit between the asynchronous circuit and the external circuits either at the output or at the input. Normally, in the case of an output buffer, such a buffer will fill up when there is excess processing power. In the proposed configuration, a control is introduced that regulates the supply voltage. For an output buffer this is done such that the buffer does not become empty and also does not tend to fill up. By itself, a full buffer is not harmful since synchronization with external circuits would then occur just as if no buffer is provided. However, overflow, as well as underflow, are never acceptable. This means that in certain circumstances the voltage regulation according to the present invention is combined with a stop-go control signalization, either in the same direction as the transfer direction of the data, or in the reverse direction, and based on a second, different, falling degree signal of said buffer. By itself, stop-go control is well known and will not be further discussed for brevity. In the Figures, an additional lead therefore has been omitted. A combination of the voltage regulation and the stop-go quasi emergency feature would avoid data loss and also realize low power consumption.

Similar to the above, for an input buffer the mechanism is not to let the buffer become full and also provide a tendency not to be empty. In this way a supply voltage is obtained that is just enough for the asynchronous circuit to perform at required performance for the current operating parameter.

FIG. 1 shows a configuration with feedback. Buffer 20 is on the output side of processing function 22. Data input I and data output O are shown. Filling degree of buffer 20 provides a feedback control signal on line(s) 24 to a voltage regulator 26. In this way the supply voltage $V_i$ is aptly regulated to an actual powering voltage $V_o$ by the voltage regulator 26. By itself, regulating a voltage level as starting from a constant voltage source is known to the skilled art worker, in view of regulating the output of a varying voltage source to a standard output voltage. By itself, also, the supply voltage need not be higher than the voltage applied to the electronic circuitry. It is conventional practice to convert a battery or other supply voltage to either a higher voltage or a lower voltage for application to the electronic circuit elements. For brevity no such conversion has been detailed on the level of the electronic circuitry. For example, a standard voltage of 5 volts could be controlled anywhere between 4 volts and 5 volts or even a little bit higher than 5 volts.

Figure 2:
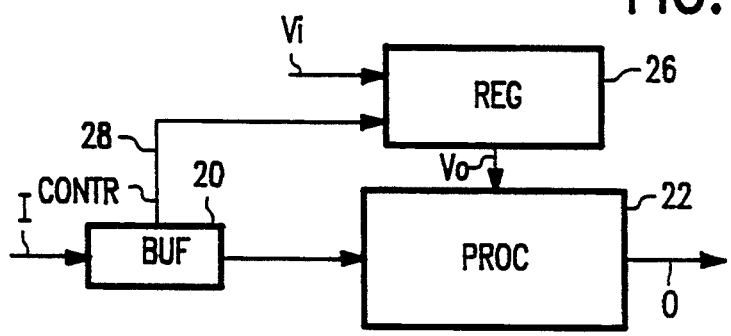
FIG. 2 shows a second embodiment of the present invention with feedback control.

Likewise, FIG. 2 shows an embodiment with a feedback control signal that is codirectional with the data flow. FIGS. 1 and 2 have an identical complement of blocks and signal lines apart from the interchange of blocks 20 and 22. Note that the nature of the control signals on lines 24, 28 is different inasmuch as in FIG. 1 a fuller buffer would slow down the processing speed, wherein in FIG. 2 a fuller buffer would speed up the processing speed. Like in Skov and Newman, supra, the control system arms to maintain the filling degree of the buffer roughly half-way.

A few examples of situations where the invention can provide remarkable benefits:

Error correction: most input provided to an error corrector can be error free. In this situation only detection and no correction is needed. The resulting reduced data processing can be done at low speed with reduced supply voltage. Depending on actual needs, the buffer may be either on the input or on the output side of the processing circuitry. Another specific aspect of error protection by error corrective codes is the trend to use the same circuitry for encoding as well as for decoding, inasfar as this suits the transfer medium (magnetic storage, two-way IR or radio wave communication digital telephone, CD recordable and the like). Obviously, the processing requirements may be different in the two directions.

High speed dubbing. Only in the situation of high speed dubbing, the supply voltage needs to be increased for the required additional performance. For normal playing conditions, the voltage will be reduced.

Figure 3:
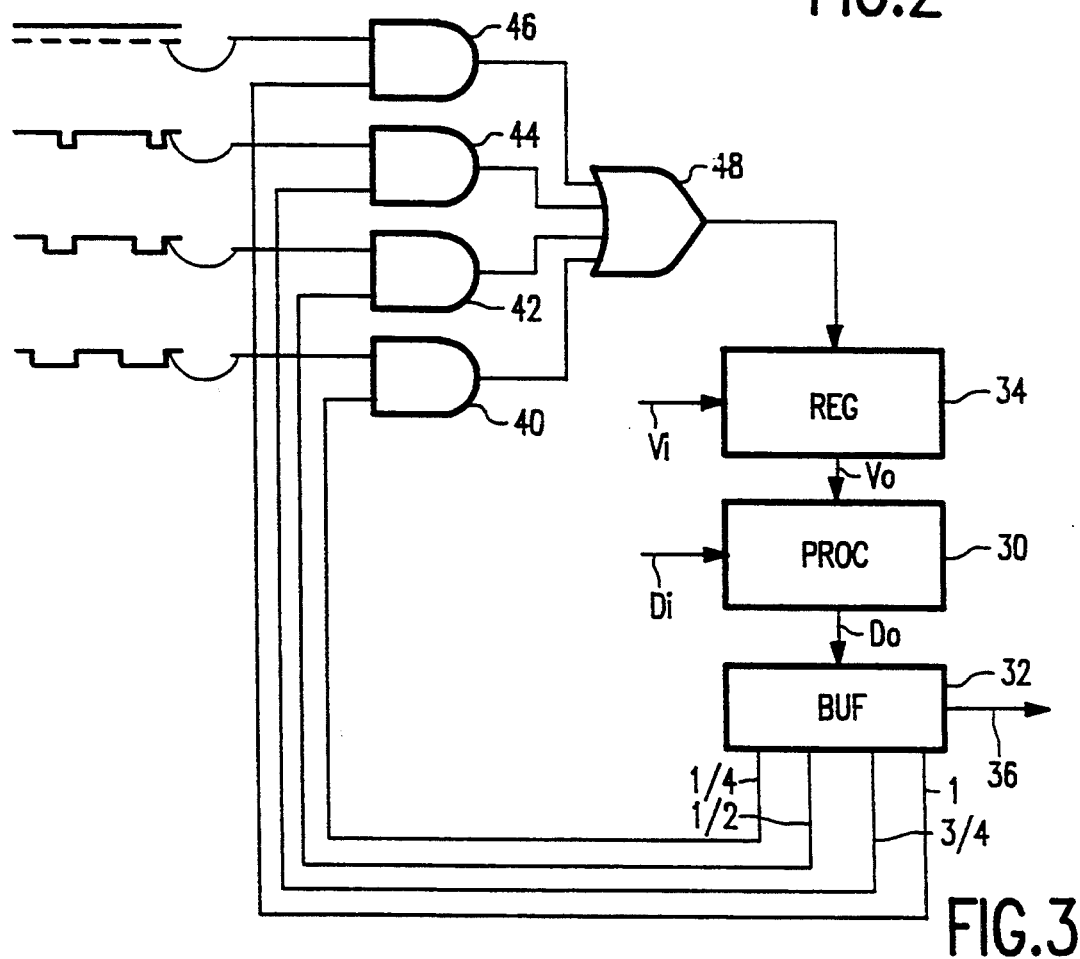
FIG. 3 shows an embodiment of the control mechanism of the present invention.

FIG. 3 shows an exemplary embodiment of the control mechanism. Processing function 30 receives data Di and produces data Do. This data is temporarily stored in buffer 32 before outputting it on line 36. The latter can operate synchronously, such as for outputting audio or video. Alternatively, line 36 carries a handshaking protocol with a data destination not shown. Herein, the initiative can be with the buffer itself or with the data destination device. Buffer 32 outputs four filling degree signals as shown that become logic 1 at $\frac{1}{4}$, $\frac{1}{2}$, $\frac{3}{4}$ and 1/1 filling degree, as shown. AND-gates 40 . . . 46 combine these filling degree signals with periodic signals of various duty cycles, as shown. The AND-function is transmitted through OR-gate 48 for controlling the regulator element 34. This outputs a continuously high voltage at a complete filling of buffer 32, varying to a 50% duty cycle signal at a filling degree of $\frac{1}{4}$ or less. Control element 34 receives battery voltage $V_i$ and outputs actual powering voltage $V_o$ that is controlled as required. In consequence, the control is effectively two-tiered: first, the filling degree of the buffer controls the duty cycle. Second, the duty cycle controls the effective powering voltage.

Figure 4:
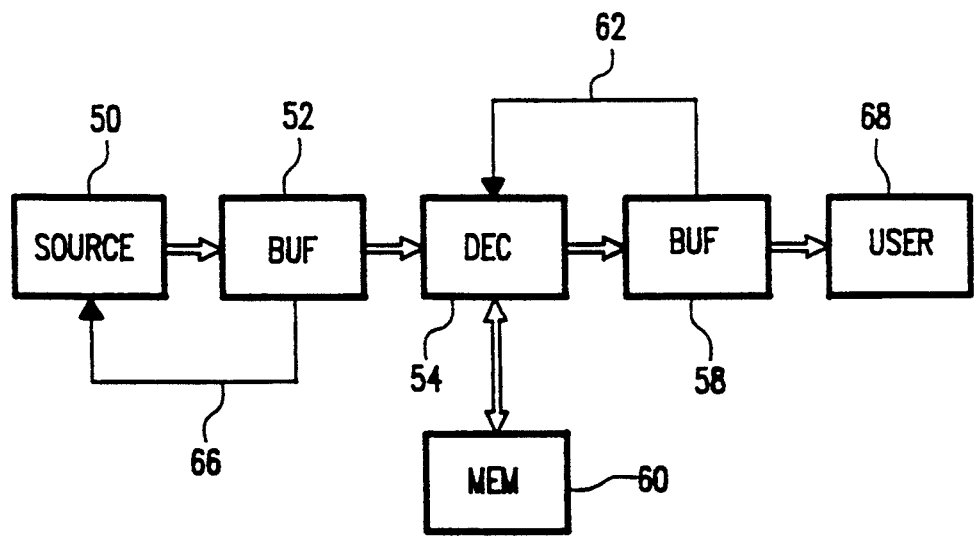
FIG. 4 is a block diagram of an error correction device for use in an apparatus according to the invention.

FIG. 4 is a block diagram of an error correction device, for example, such as used for compact disc digital audio. Block 50 is the compact disc interface that outputs a stream of 8 bit symbols that consists of data symbols and parity symbols of a cross-interleaved Reed-Solomon code. It may also output reliability indicators on symbol basis and further signals that may be used for the decoding, but that are not discussed further. Block 52 represents a first level buffer that interfaces between block 50 and central decoder/router 54. Information received from buffer 52 is forwarded by central element 54 to RAM storage 60 that contains intermediate information of various categories:

symbols before decoding
symbols of words that are still being decoded
symbols of fully decoded words that have not yet been called up for outputting.

To this effect, block 60 receives addresses from block 54 and communicates data bidirectionally with block 54. There is consistent data flow equalization between blocks 50, 52 which means that total filling degree of block 52 is approximately constant. Any deviation is signalled on fine 66 to the Compact Disc interface and will control the speed of the turntable thereof. Such variations of course are on a relatively long time-scale in view of the rotational inertia of the turntable.

Block 58 represents the user output buffer that operates in FIFO-organization. In contradistinction thereto, block 60 operates according to random accessibility in view of a CD's complex interleaving and scrambling techniques. Block 68 is the synchronous user-oriented interface inclusive of such elements as digital-analog conversion.

Block 54 contains the decoder proper that routes and processes channel symbols cum associated reliability flags. By itself the processing may be along conventional ways. The processing result is either correct symbols or unreliable symbols with associated flags. In case of unreliable symbols, further measures may be interpolating or muting. This may be done either within decoder 54 or within user interface 68.

As soon as a multi-symbol word is completely decoded, the symbols thereof may be outputted from RAM 60 to output buffer 58 under synchronization by the internal clock of system 54. In view of the different complexity of the decoding on a word by word basis, this makes the dam outputting rate from RAM 60 rather irregular. This irregularity is then smoothed out by the output buffer of block 58.

Block 58 is read out by a synchronous clock to maintain reproduction pitch constant. This clock has not been shown for brevity. A filling degree signal is output on line 62, which as indicated in the foregoing, may control the powering voltage of block 54 to influence its operating speed. In the example, it is understood that the operating frequency of RAM 60 is always sufficient to cope with the access requirements from block 54. In the opposite case, the powering voltage of RAM 60 should be controlled as well. It should be noted that the control by means of a filling degree signal from output buffer in block 58 operates on a relatively short time scale. The control of the turntable via line 66 operates on a much longer time scale. The ratio may be a factor of 10. One of the relevant parameters is the size of the various buffers. The larger the storage in block 58, the slower and smaller the variations of the powering voltage. It has been found for CMOS-circuitry that power consumption varies as the square of the powering voltage. This means that larger variations in powering voltage level will increase power consumption. To a certain degree, therefore, power consumption in an apparatus according to the present invention would decrease with buffer size. In the arrangement, certain provisions may have two or all of the storage devices 52, 58, 60 as part of a single storage subsystem while keeping the controls and data paths as shown. From the foregoing, it would also be obvious that controlling powering voltage level according to an on/off scheme is very unattractive. First, it would lead to a higher overall power consumption as explained supra. Second, it could give rise to dynamic problems related to the starting and termination, respectively, of the processing. Third, the input system 50 could not be controlled instantaneously, so its continuous data input would have to be served anyway. All of these arguments favour a more gradual control policy. Actual granularity of the control mechanism is a trade off between optimum operation versus necessary investment.

Figure 5A:
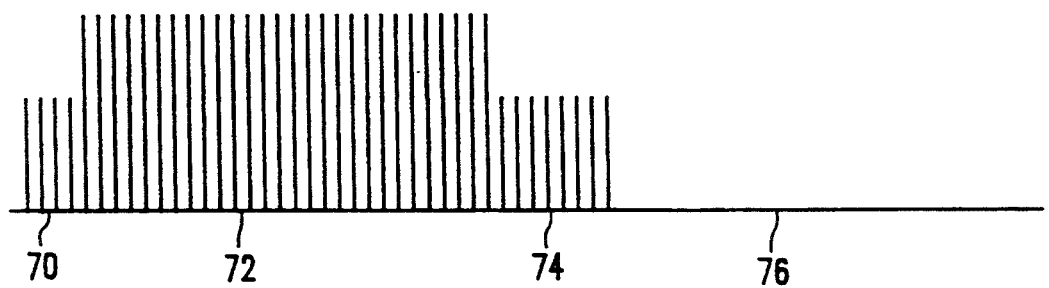
FIG. 5 is an energy-consumption diagram therefor.
Figure 5B:
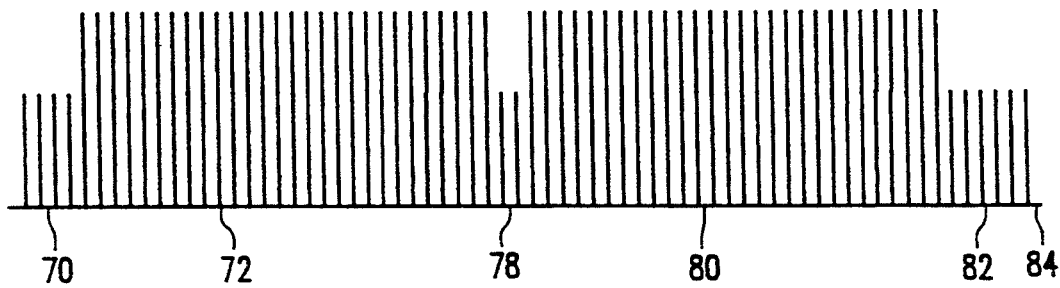

FIG. 5 is an energy consumption diagram for the arrangement of FIG. 4. The vertical lines relate the energy consumption for each of a series of sequential operations. FIG. 5A relates to a word (28 symbols of 8 bits each); powering voltage for FIGS. 5A, 5B is identical. At 70 there is initialization and resetting. Each of lines 72 relates to the multiplying of one symbol with the parity check matrix. At 74 the syndromes are checked and -zero- errors are detected. At 76 the decoding is ready and dissipation is essentially zero until decoding of the next code word commences. In practice, the operations during intervals 70, 72, 74 and their relation to power consumed are somewhat more complicated, but the overall trend of power consumption is as shown, just to prove the advantages of the present invention, whereas the decoding proper has been described in numerous instances elsewhere.

The pattern in FIG. 5B corresponds thereto in parts 70, 72. At 78 incorrectness is detected and the decision is made to effect a Chien search. At 80, for each symbol location the Chien search locator is evaluated. At 82 the errors located are corrected and the word is outputted. At 84 power consumption is virtually zero. Again, another error correction algorithm would produce a similar pattern, in particular, in that the number of processing cycles would be much greater, each such processing cycle taking a generally uniform amount of energy consumption. As shown, the processing in FIG. 5B takes twice as much time. Therefore, in FIG. 5A the powering voltage may be reduced so that both operations would need equal time. Of course, this cannot be done on the basis of a single word or frame, but only on the filling degree of the buffer. Generally, in CMOS the power goes as the square of the voltage.

Various other factors may also influence the number of processing steps in decoding a compact disc word:
the policy to be followed: certain words are signalled beforehand as easy, difficult, and hopeless, respectively;
certain words carry clues as to where errors are probably located.
All this would influence policy. Further, it has been contemplated to use the decoder hardware for encoding. This can be done by considering the locations of the parity symbols as error locations that are known beforehand. Now, a CD code word has four parity symbols to correct two errors at unknown locations of four erasures of which the locations were known. This means that during such encoding the number of pseudo erasures is twice as high as during normal error decoding. This would tend to make encoding more complicated and so more time-consuming than normal decoding.

Recapitulating, the invention may be applied in many fields of use, including portable apparatus, battery apparatus, consumer electronics apparatus, telephone apparatus that is based on a conversion key, table of expression set (such demodulation by table, or decoding by means of public key or parity check matrix), dubbing based apparatus, broadcast reception, infrared reception apparatus, audio/video apparatus. The circuitry may be in various technology, such as ECL, CMOS, bipolar or various others.

We claim:

1. A digital apparatus comprising: buffer means for receiving and intermediate storage of data and subsequent outputting thereof to a data processing means, said data processing means comprising electronic integrated circuitry based on self-timed elements wherein the operating speed of said electronic circuitry is directly determined by its supply voltage, a source of power supply voltage for said electronic circuitry, and feedback means for, under control of a filling degree signal of said buffer means, controlling, via said supply voltage source, the actual power supply voltage of said electronic circuitry for dynamically controlling the data handling rate of said data processing means.

2. The digital apparatus as claimed in claim 1, wherein said self-timed elements are delay-insensitive elements.

3. The digital apparatus as claimed in claim 2, wherein said delay-insensitive elements have interelement interfacing by handshake means.

4. A digital apparatus comprising:
data source means including integrated digital data processing asynchronous electronic circuitry based on self-timed elements wherein the operating speed of said electronic circuitry is directly determined by its power supply voltage,
a source of power supply voltage coupled to said data source means to provide the power supply voltage for said electronic circuitry,
buffer storage means receiving data from said data source means and providing intermediate storage of said data and a subsequent output thereof, and
feedback means coupled to said source of power supply voltage and, under the control of a filling degree signal of said buffer storage means, controlling the source of power supply voltage to vary the actual supply voltage provided to said electronic circuitry so as to dynamically control the data handling rate of said data source means as a function of the filling degree signal.

5. The digital apparatus as claimed in claim 4, wherein said self-timed elements are delay-insensitive elements.

6. The digital apparatus as claimed in claim 5, wherein said delay-insensitive elements have interelement interfacing by handshake means.

7. The digital apparatus as claimed in claim 4, wherein said apparatus is battery-powered.

8. The digital apparatus as claimed in claim 4, wherein said apparatus is portable.

9. The digital apparatus as claimed in claim 4, further including telephone circuitry.

10. The digital apparatus as claimed in claim 4 wherein said data processing electronic circuitry is programmed for error correction of said data as based on digital error correcting code.

11. The digital apparatus as claimed in claim 4, wherein said data processing electronic circuitry is programmed for data conversion as based on at least one of conversion key, conversion table and a conversion expression set.

12. The digital apparatus as claimed in claim 4 wherein said data processing electronic circuitry includes high-speed dubbing means.

13. The digital apparatus claimed in claim 4 wherein said data is received by broadcast via a physical medium.

14. The digital apparatus as claimed in claim 4, wherein said data represent at least one of audio and video information.

15. The digital apparatus as claimed in claim 4, further including stop-go control means based upon a second filling degree signal of said buffer storage means effective on said electronic circuitry.

16. Apparatus for controlling the flow of data in an electronic digital data processing circuit, said apparatus comprising:
   digital data processing electronic circuitry based on self-timed circuit elements wherein the operating speed of said electronic circuitry is determined by an energizing voltage supplied to said electronic circuitry,
   a voltage regulator coupled to said digital data processing electronic circuitry for supplying the energizing voltage thereto,
   buffer storage means for the intermediate storage of digital data and the subsequent supply thereof,
   means for coupling said buffer storage means to said digital data processing electronic circuitry, and
   feedback means which, under control of a filling degree signal of said buffer storage means, controls the voltage regulator so as to adjust the level of the energizing voltage supplied to the digital data processing electronic circuitry so as to dynamically control the rate of flow of data in said digital data processing electronic circuitry and thereby control data flow through the buffer storage means.

17. Data control apparatus as claimed in claim 16, wherein said buffer storage means comprises a digital buffer storage device coupled either to an input or an output of the digital data processing electronic circuitry and to the voltage regulator, said data control apparatus further comprising a battery as a source of voltage for the voltage regulator.

18. Data control apparatus as claimed in claim 16, wherein said voltage regulator provides a relatively smooth adjustment of the energizing voltage level and said data control apparatus further comprises a battery as a source of voltage for the voltage regulator.

19. Data control apparatus as claimed in claim 18, further comprising means providing a stop-go control of the flow of data between the buffer storage means and the digital data processing electronic circuitry as a function of a second filling degree signal of the buffer storage means.

20. Data control apparatus as claimed in claim 16 which comprises a portable apparatus powered by a battery and including asynchronous electronic circuits, said voltage regulator, under control of the filling degree signal of the buffer storage means, being operative to reduce the power consumption of the asynchronous electronic circuits.

21. Data control apparatus as claimed in claim 16, further comprising a battery as a source of voltage for the voltage regulator, and wherein said voltage regulator adjusts the energizing voltage level in response to said filling degree signal so as to control the data flow rate such that the buffer storage means does not overflow nor does it become empty.

22. A digital apparatus comprising:
   a data source including integrated digital data processing asynchronous electronic circuitry based on self-timed elements wherein the operating speed of said electronic circuitry is directly determined by its power supply voltage,
   a source of power supply voltage coupled to said data source to provide the power supply voltage for said electronic circuitry,
   buffer storage means coupled to said data source so as to provide intermediate storage of said data and a subsequent output thereof, and
   feedback means coupled to said source of power supply voltage and, under the control of a filling degree signal of said buffer storage means, controlling the source of power supply voltage to vary the actual supply voltage provided to said electronic circuitry so as to dynamically control the data handling rate of said data source as a function of the filling degree signal.

* * * * *